United States Patent
Shigihara

(10) Patent No.: US 12,542,426 B2
(45) Date of Patent: Feb. 3, 2026

(54) SEMICONDUCTOR LASER DEVICE

(71) Applicant: Mitsubishi Electric Corporation, Tokyo (JP)

(72) Inventor: Kimio Shigihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 804 days.

(21) Appl. No.: 17/758,957

(22) PCT Filed: Feb. 13, 2020

(86) PCT No.: PCT/JP2020/005479
§ 371 (c)(1),
(2) Date: Jul. 15, 2022

(87) PCT Pub. No.: WO2021/161438
PCT Pub. Date: Aug. 19, 2021

(65) Prior Publication Data
US 2023/0075645 A1  Mar. 9, 2023

(51) Int. Cl.
*H01S 5/32* (2006.01)
*H01S 5/20* (2006.01)
*H01S 5/22* (2006.01)

(52) U.S. Cl.
CPC .......... *H01S 5/3216* (2013.01); *H01S 5/2036* (2013.01); *H01S 5/22* (2013.01); *H01S 5/222* (2013.01); *H01S 5/3213* (2013.01)

(58) Field of Classification Search
CPC ......... H01S 5/2036; H01S 5/22; H01S 5/3213
See application file for complete search history.

(56) References Cited

U.S. PATENT DOCUMENTS

| | | | |
|---|---|---|---|
| 2003/0156612 A1* | 8/2003 | O'Gorman | H01S 5/20 372/19 |
| 2017/0117685 A1* | 4/2017 | Shigihara | H01S 5/2031 |
| 2018/0076594 A1 | 3/2018 | Shigihara et al. | |

FOREIGN PATENT DOCUMENTS

| | | | |
|---|---|---|---|
| JP | 2006295016 A | * | 10/2006 |
| JP | 2017-084845 A | | 5/2017 |
| JP | 2018-046118 A | | 3/2018 |

OTHER PUBLICATIONS

Kawakami, "Optical Waveguide", Asakura Publishing Co., Ltd, Sep. 20, 1982, pp. 21.

(Continued)

*Primary Examiner* — Michael Carter
(74) *Attorney, Agent, or Firm* — Studebaker Brackett PLLC

(57) ABSTRACT

A semiconductor laser device includes a first conductivity type cladding layer having a refractive index $n_{c1}$, a first conductivity type side optical guide layer, an active layer, a second conductivity type side optical guide layer, and a second conductivity type cladding layer of $n_{c2}$ laminated in order on a first conductivity type semiconductor substrate, wherein an oscillation wavelength is $\lambda$, a first conductivity type low refractive index layer of $n_1$ lower than $n_{c1}$ having a thickness of $d_1$ is provided between the first conductivity type side optical guide layer and the first conductivity type cladding layer, a second conductivity type low refractive index layer of $n_2$ lower than $n_{c2}$ having a thickness of $d_2$ is provided between the second conductivity type side optical guide layer and the second conductivity type cladding layer, and a condition of a normalization frequency $v_2 > v_1$ is satisfied.

9 Claims, 10 Drawing Sheets

(56) References Cited

OTHER PUBLICATIONS

D. Gloge, "Weakly Guiding Fibers" Applied Optics vol. 10, No. 10, pp. 2252-2258, Oct. 1971.
Edited and written by Iga, "Semiconductor Laser" Ohmsha, Oct. 25, 1994, pp. 35-38.
G.B. Hocker and W.K. Burns, "Mode dispersion in diffused channel waveguides by the effective index method" Applied Optics vol. 16, No. 1. pp, 113-118, Jan. 1977.
International Search Report issued in PCT/JP2020/005479; mailed Apr. 21, 2020.
An Office Action; "Notice of Reasons for Refusal," mailed by the Japanese Patent Office on Jan. 10, 2023, which corresponds to Japanese Patent Application No. 2021-577779 and is related to U.S. Appl. No. 17/758,957; with English language translation.
The extended European search report issued by the European Patent Office on Apr. 11, 2023, which corresponds to European Patent Application No. 20919188.1-1212 and is related to U.S. Appl. No. 17/758,957.

\* cited by examiner

SEMICONDUCTOR LASER DEVICE

TECHNICAL FIELD

The present application relates to a semiconductor laser device.

BACKGROUND ART

In a semiconductor laser device, particularly a high-power semiconductor laser device, it is required to make the oscillation efficiency as high as possible in order to reduce waste heat and simplify a cooling device. For example, Patent Document 1 discloses a semiconductor laser device having a high slope efficiency and a high power conversion efficiency at a high output. FIG. 27 of Patent Document 1 shows a ridge type semiconductor laser device including an optical guide layer thick enough to allow a first-order or higher-order mode in the lamination direction of the crystal, an active layer disposed on a p-type cladding layer side to the center of optical guide layers, an n-type low refractive index layer having a refractive index $n_{l1}$ lower than the refractive index of an n-type cladding layer and a layer thickness $d_{l1}$ between the n-type cladding layer having a refractive index $n_c$ and an n-side optical guide layer, and a p-type low refractive index layer having a refractive index $n_{l2}$ lower than the refractive index of the p-type cladding layer and a layer thickness $d_{l2}$ between the p-type cladding layer having the refractive index $n_c$ and a p-side optical guide layer, and satisfying the following Equation (1).

$$\sqrt{n_c^2 - n_{l1}^2}\, d_{l1} > \sqrt{n_c^2 - n_{l2}^2}\, d_{l2} \qquad (1)$$

CITATION LIST

Patent Document

Patent Document 1: Japanese Unexamined Patent Application Publication No.

Non-Patent Document

Non-Patent Document 1: Written by Kawakami, "Optical Waveguide", Asakura Publishing Co., Ltd, Sep. 20, 1982, pp. 21

Non-patent Document 2: Edited and written by Iga, "Semiconductor Laser", Ohmsha, Oct. 25, 1994, pp. 35-38

Non-Patent Document 3: G. B. Hocker and W. K. Burns, "Mode dispersion in diffused channel waveguides by the effective index method" Appl. Opt. Vol. 16, No. 1. pp. 113-118, 1977

SUMMARY OF INVENTION

Problems to be Solved by Invention

It has been examined to apply the structure of the semiconductor laser device described in Patent Document 1 to a broad area type semiconductor laser device having a ridge shape in which a first-order or higher-order mode is allowed in the direction (horizontal direction) perpendicular to the lamination direction of the crystal and the direction of the resonator length, but it has been found that there are problems in that the beam divergence angle in the horizontal direction is widened, the luminance is lowered, and the coupling efficiency with an optical component is low.

The present application discloses a technique for solving the above-mentioned problems, and an object thereof is to obtain a broad area type semiconductor laser device having a ridge shape in which the divergence angle in the horizontal direction is narrowed and the coupling efficiency with an optical component is increased.

Means for Solving Problems

A semiconductor laser device disclosed in the present application includes a first conductivity type cladding layer having a refractive index $n_{c1}$, a first conductivity type side optical guide layer, an active layer, a second conductivity type side optical guide layer, a second conductivity type cladding layer having a refractive index $n_{c2}$, and a resonator in which laser light travels back and forth, the above layers being laminated in order on a semiconductor substrate of a first conductivity type, wherein a structure of the device is such that a first-order or higher-order mode is allowed in a lamination direction in a cross section perpendicular to an optical axis direction of the resonator and is a broad area structure in which a first-order or higher-order mode is allowed in a direction perpendicular to the optical axis direction of the resonator and the lamination direction, the broad area structure being with a ridge shape having a ridge region and cladding regions on both sides of the ridge region; and a first conductivity type low refractive index layer having a thickness of $d_1$ and a refractive index $n_1$ lower than $n_{c1}$ is provided between the first conductivity type side optical guide layer and the first conductivity type cladding layer or inside the first conductivity type cladding layer, a second conductivity type low refractive index layer having a thickness of $d_2$ and a refractive index $n_2$ lower than $n_{c2}$ is provided between the second conductivity type side optical guide layer and the second conductivity type cladding layer or inside the second conductivity type cladding layer, and a relationship $$\frac{2\pi}{\lambda}\sqrt{n_{c2}^2 - n_2^2}\,\frac{d_2}{2} > \frac{2\pi}{\lambda}\sqrt{n_{c1}^2 - n_1^2}\,\frac{d_1}{2}$$

is satisfied.

Effect of Invention

According to the semiconductor laser device disclosed in the present application, a semiconductor laser device can be obtained in which the number of modes allowed in the horizontal direction can be reduced, the horizontal divergence angle can be narrowed, and a high coupling efficiency with an optical component can be obtained.

MODES FOR CARRYING OUT INVENTION

Figure 7:
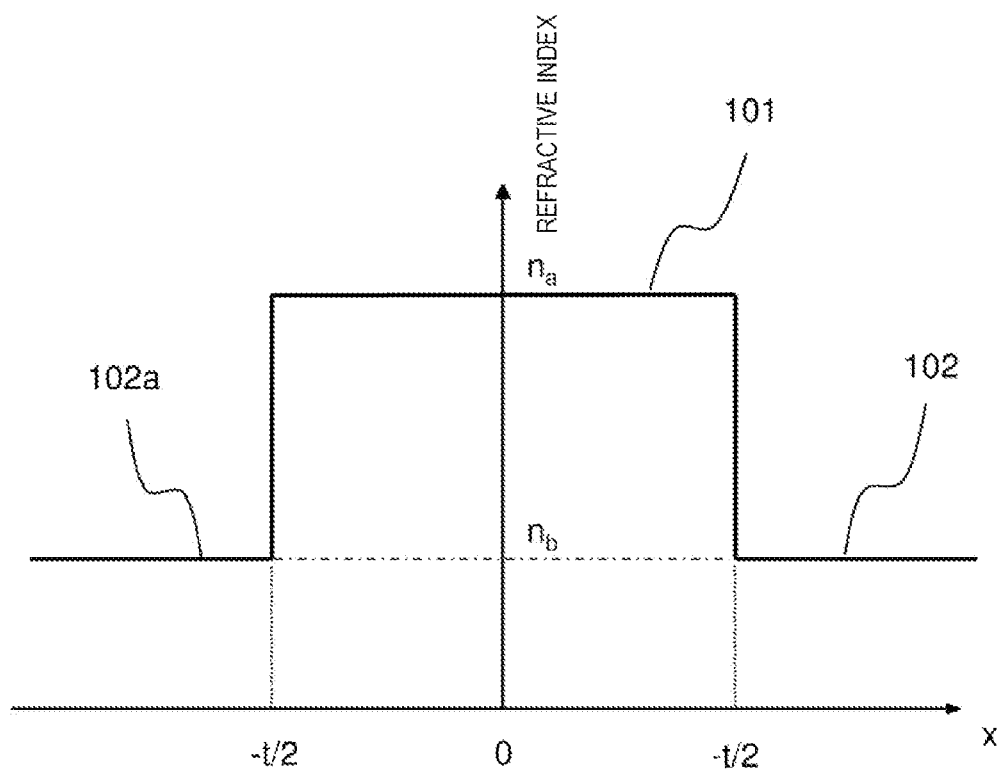
FIG. 7 is a schematic diagram showing a refractive index distribution of an optical waveguide.

The phenomenon in which the beam divergence angle in the horizontal direction is widened when the structure of Patent Document 1 is applied to a broad area type semiconductor laser device was examined in detail, and it was found that the phenomenon is caused by a multimode oscillation in the horizontal direction. Hereinafter, it will be described referring to the drawings. FIG. 7 is a schematic diagram showing a refractive index distribution of an optical waveguide, which will be used for explaining a normalized frequency v. In FIG. 7, a core region 101 has a refractive index $n_a$ and a width of t, a cladding region 102 and a cladding region 102a have a refractive index $n_b$, and a relationship $n_a > n_b$ holds. The normalized frequency v is defined by Equation (2) using an oscillation wavelength λ (refer to Non-Patent Document 1).

$$v \equiv \frac{2\pi}{\lambda}\sqrt{n_a^2 - n_b^2}\,\frac{t}{2} \quad (2)$$

When Equation (2) and Equation (1) is compared, it can be seen that Equation (1) is based on the normalized frequency v. Therefore, when a low refractive index layer having a refractive index $n_1$ and a layer thickness $d_1$ is inserted between a cladding layer and a guide layer that have a refractive index $n_c$, the magnitude relationship shown in Equation (1) is expressed using $v_1$ in Equation (3) instead of Equation (1). That is, using the definition of Equation (3), Equation (1), which is the condition disclosed in Patent Document 1, indicates a condition $v_1 > v_2$.

$$v_i \equiv \frac{2\pi}{\lambda}\sqrt{n_c^2 - n_i^2}\,\frac{d_i}{2} \quad (3)$$

$i = 1$ or $2$

Figure 8:
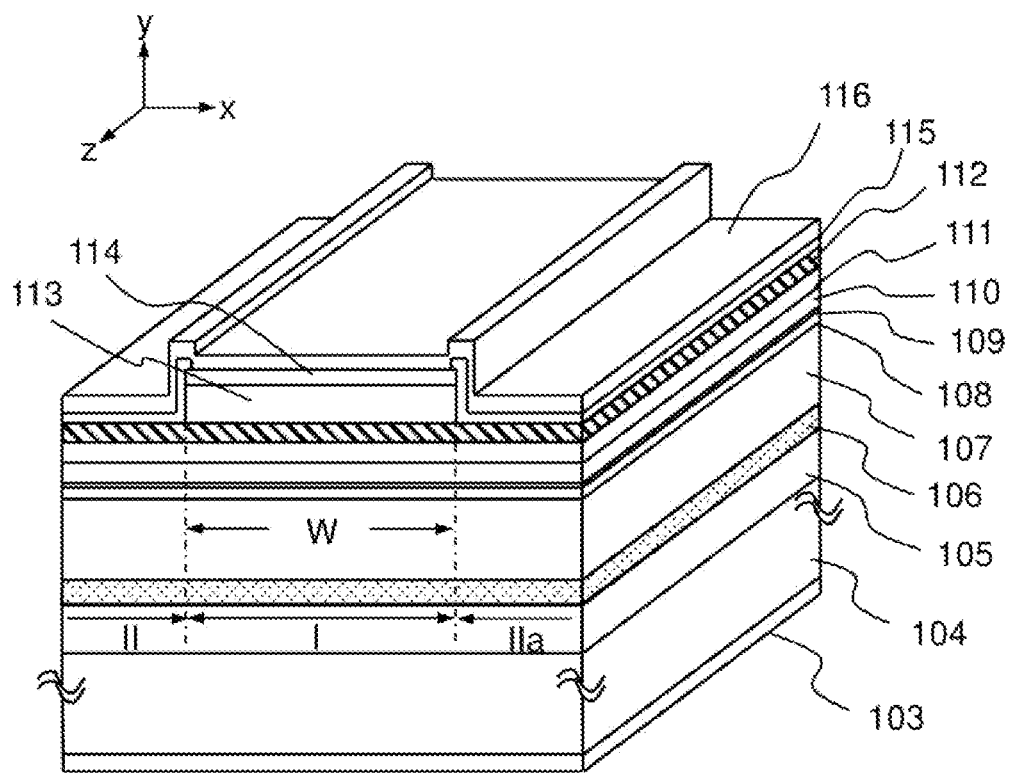
FIG. 8 is a schematic perspective view showing a laminated structure of a semiconductor laser device according to a comparative example.

FIG. 8 is a schematic perspective view showing a laminated structure of an example in which a technique disclosed in Patent Document 1 is applied to a broad area type semiconductor laser device having a ridge shape with an oscillation wavelength of 975 nm. Layers in FIG. 8 comprises, from the bottom of FIG. 8, an n-type electrode 103, an n-type GaAs substrate 104, an n-type AlGaAs cladding layer 105 having an Al composition ratio of 0.20 and a layer thickness of 1.5 μm, an n-type AlGaAs low refractive index layer 106 having the Al composition ratio of 0.25 and the layer thickness $d_1$ (also referred to as n-type low refractive index layer, the refractive index is $n_1$), an n-side AlGaAs second optical guide layer 107 having the Al composition ratio of 0.16 and a layer thickness of 1100 nm, an n-side AlGaAs first optical guide layer 108 having the Al composition ratio of 0.14 and a layer thickness of 100 nm (the combination of 107 and 108 is also referred to as n-side optical guide layer), an InGaAs quantum well active layer 109 having an In composition ratio of 0.119 and a layer thickness of 8 nm, a p-side AlGaAs first optical guide layer 110 having the Al composition ratio of 0.14 and a layer thickness of 300 nm, a p-side AlGaAs second optical guide layer 111 having the Al composition ratio of 0.16 and a layer thickness of 300 nm (the combination of 110 and 111 is also referred to as p-side optical guide layer), a p-type AlGaAs low refractive index layer 112 having the Al composition ratio of 0.55 and a layer thickness $d_2$ (also referred to as p-type low refractive index layer, the refractive index is $n_2$), a p-type AlGaAs cladding layer 113 having the Al composition ratio of 0.20 and a layer thickness of 1.5 μm, a p-type GaAs contact layer 114, an SiN film 115 having a film thickness of 0.2 μm, and a p-type electrode 116. The reason why the In composition ratio of the InGaAs quantum well active layer is 0.119 and the layer thickness is 8 nm is that the oscillation wavelength is made to be substantially 975 nm. A region I is a ridge region having a width W, and regions II and IIa are cladding regions outside the ridge region.

Note that surfaces constituting a resonator for making laser light travel back and forth are provided at both ends by, for example, cleavage. As shown in FIG. 8, the direction in which the laser light travels back and forth, namely, the optical axis direction of the laser light is the z-direction, the lamination direction of each layer is the y-direction, and the direction perpendicular to the z-direction and the y-direction, namely, the width direction of the ridge is the x-direction. In other figures in the present application, the directions of x, y and z are the same.

Figure 9:
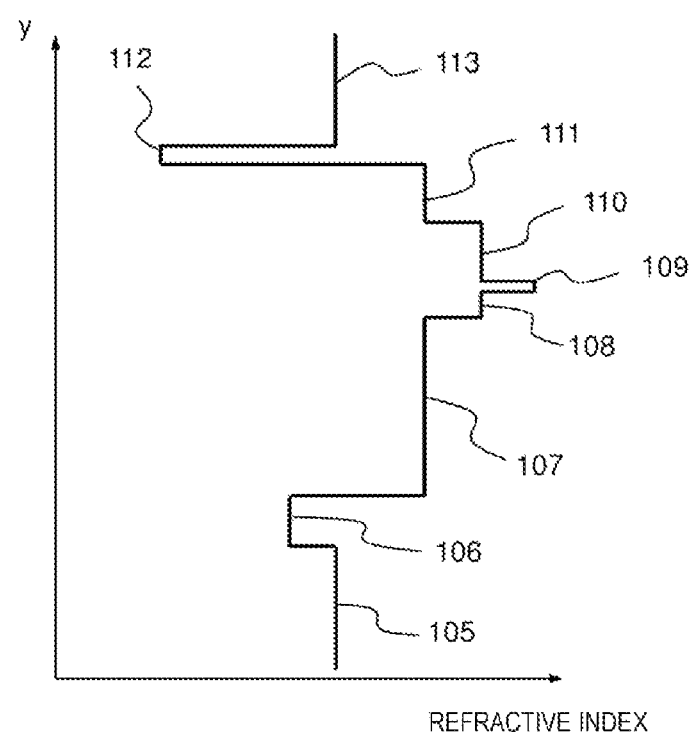
FIG. 9 is a diagram for explaining a refractive index distribution in a lamination direction in a ridge region of the structure of FIG. 8.
Figure 10:
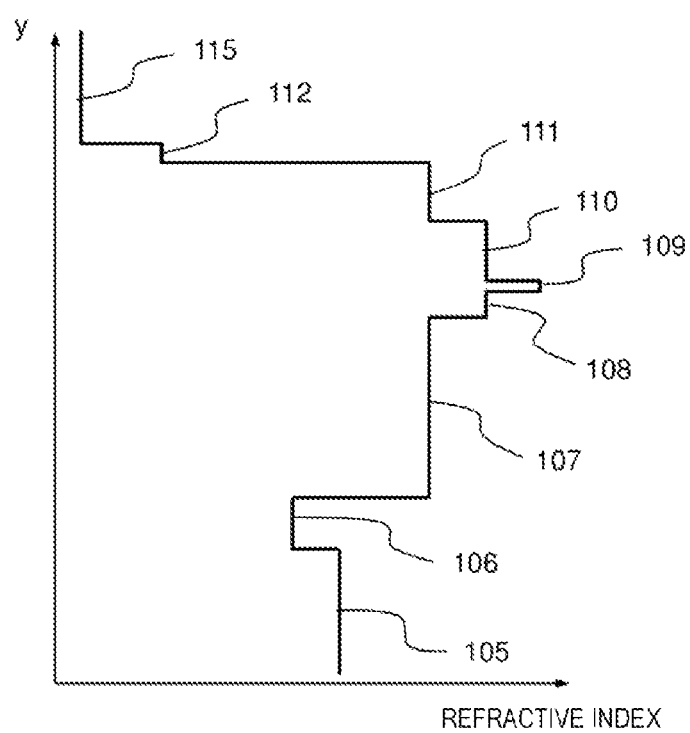
FIG. 10 is a diagram for explaining a refractive index distribution in the lamination direction in an outer region of the ridge region of the structure of FIG. 8.

Using the refractive index calculation described in Non-Patent Document 2, the refractive indices of AlGaAs layers having Al composition ratios of 0.14, 0.16, 0.20, 0.25 and 0.55 at the wavelength of 975 nm, for example, are 3.432173, 3.419578, 3.394762, 3.364330 and 3.191285, respectively. Further, the refractive indices of InGaAs having an In composition ratio of 0.119 and SiN are empirically 3.542393 and 2.00, respectively. FIG. 9 shows a refractive index distribution of the ridge region in the y-direction, and FIG. 10 shows a refractive index distribution of the cladding region outside the ridge region in the y-direction.

When a layer thickness $d_n$ of the n-type low refractive index layer is 200 nm, $v_1$ of Equation (3) is 0.292273 at the wavelength of 975 nm. At this time, when a layer thickness $d_p$ of the p-type low refractive index layer is 40 nm, $v_2$ of Equation (3) is 0.149202, the condition $v_1 > v_2$ holds, and Equation (1), which is the condition disclosed in Patent Document 1, is satisfied.

The semiconductor laser device shown in FIG. 8 can be regarded as a three-layer slab waveguide having a width W in the x-direction if effective refractive indices of regions I, II, and IIa are known. In this case, v is obtained from Equation (2), and the number of modes allowed in the x-direction can be known from how many times the value of v is multiplied by π/2. The effective refractive index can be obtained by, for example, the equivalent refractive index method described in Non-Patent Document 3. In the case of the semiconductor laser device shown in FIG. 8, the effective refractive indices of regions I, II, and IIa are obtained to be 3.41738, 3.41600, and 3.41600, respectively. Assuming that the ridge width W is 100 µm, the value v is 31.28979, and 20 modes from the zeroth order (fundamental mode) to the nineteenth order are to be allowed. The larger the order, the wider the divergence angle, and thus the larger the number of allowed modes, the wider the divergence angle.

As described above, it has been clarified that the conventional broad area type semiconductor laser device having the ridge shape, which satisfies the condition $v_1 > v_2$ corresponding to the condition disclosed in Patent Document 1, has a problem in that the number of modes allowed in the horizontal direction is large, and thus the divergence angle in the horizontal direction becomes large, and the coupling efficiency with an optical component is low.

On the basis of the above examination result, results obtained by examining structures in which the number of modes allowed in the horizontal direction is small will be described in each of embodiments.

Embodiment 1

Figure 1:
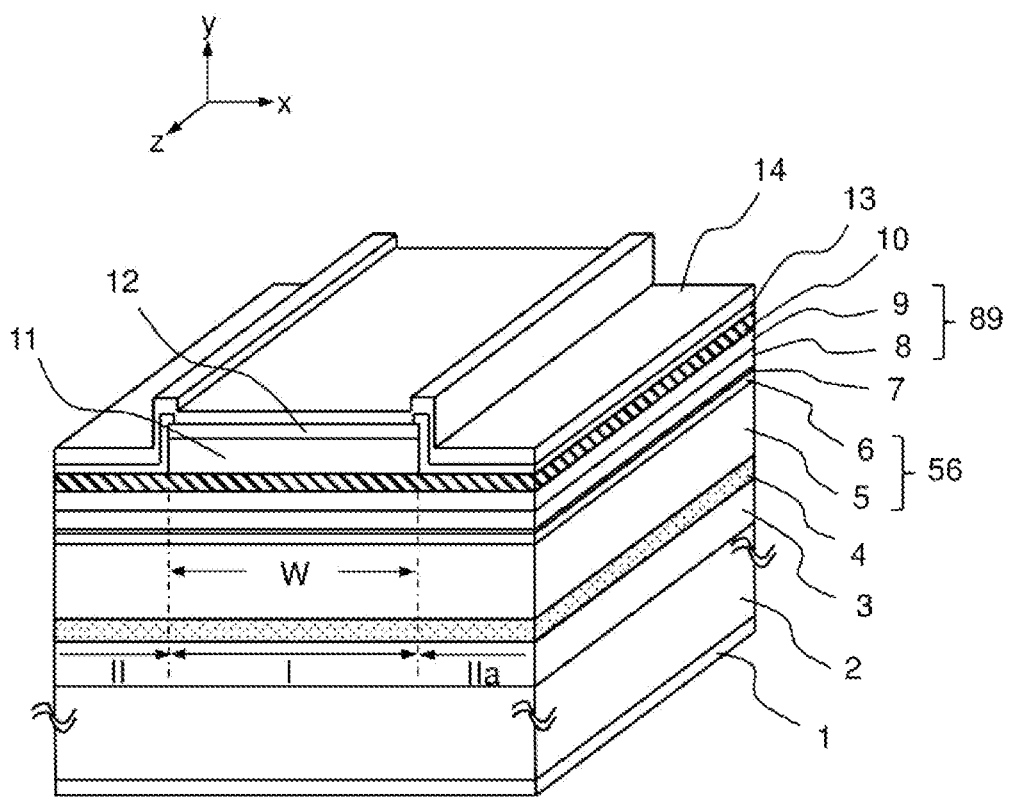
FIG. 1 is a schematic perspective view showing a laminated structure of a semiconductor laser device according to Embodiment 1.

FIG. 1 is a schematic perspective view showing a laminated structure of a semiconductor laser device according to Embodiment 1, that is, a broad area type semiconductor laser device having a ridge shape. The semiconductor laser device according to the present embodiment is a semiconductor laser device in which an active layer position in guide layers is shifted from the center of the guide layers to a p-type cladding layer side, thereby reducing the number of carriers staying in the guide layers during operation and increasing a slope efficiency.

In FIG. 1, layers comprises, from the bottom thereof, an n-type electrode 1, an n-type GaAs substrate 2 (also, simply referred to as semiconductor substrate), an n-type AlGaAs cladding layer 3 (also, simply referred to as n-type cladding layer or first conductivity type cladding layer, refractive index $n_{c1}$) having an Al composition ratio of 0.20 and a layer thickness of 1.5 µm, an n-side AlGaAs low refractive index layer 4 (also, referred to as n-side low refractive index layer or first conductivity type low refractive index layer 4, refractive index $n_1$) having the Al composition ratio of 0.25 and the layer thickness $d_1$, an n-side AlGaAs second optical guide layer 5 (also, referred to as n-side second optical guide layer or first conductivity type side second optical guide layer) having the Al composition ratio of 0.16 and a layer thickness of 1100 nm, an n-side AlGaAs first optical guide layer 6 (also, referred to as n-side first optical guide layer or first conductivity type side first optical guide layer) having the Al composition ratio of 0.14 and a layer thickness of 100 nm, an InGaAs quantum well active layer 7 having an In composition ratio of 0.119 and a layer thickness of 8 nm, a p-side AlGaAs first optical guide layer 8 (also, referred to as p-side first optical guide layer or second conductivity type side first optical guide layer) having the Al composition ratio of 0.14 and a layer thickness of 300 nm, a p-side AlGaAs second optical guide layer 9 (also, referred to as p-side second optical guide layer or second conductivity type side second optical guide layer) having the Al composition ratio of 0.16 and a layer thickness of 300 nm, a p-type AlGaAs low refractive index layer 10 (also, referred to as p-type low refractive index layer or second conductivity type low refractive index layer, refractive index $n_2$) having the Al composition ratio of 0.55 and the layer thickness $d_2$, a p-type AlGaAs cladding layer 11 (also, referred to as p-type cladding layer or second conductivity type cladding layer, refractive index $n_{c2}$) having the Al composition ratio of 0.20 and a layer thickness of 1.5 µm, a p-type GaAs contact layer 12, a SiN film 13 having a film thickness of 0.2 µm, and a p-type electrode 14. Note that the n-side second optical guide layer 5 and the n-side first optical guide layer 6 is also collectively referred to as n-side optical guide layer 56 or first conductivity type side optical guide layer 56, and the p-side first optical guide layer 8 and the p-side second optical guide layer 9 is also collectively referred to as p-side optical guide layer 89 or second conductivity type side optical guide layer 89. Since these optical guide layers are usually undoped layers, "side" is added to distinguish which side of the active layer 7 the optical guide layers are on. The reason why the In composition ratio of the InGaAs quantum well active layer 7 is 0.119 and the layer thickness is 8 nm is that the oscillation wavelength is made to be substantially 975 nm. A region I is a ridge region having a width W, and regions II and IIa are cladding regions outside the ridge region.

In the description of the present application, a structure in which a ridge structure is formed on the p-type contact layer side by using the semiconductor substrate 2 of the n-type is described, but to the contrary, a similar effect can be obtained by forming the ridge on the n-type contact layer side by using the semiconductor substrate 2 of the p-type. The conductivity type of the semiconductor substrate 2 may be referred to as first conductivity type, and the conductivity type opposite to that of the semiconductor substrate 2 may be referred to as second conductivity type. That is, if the first conductivity type is n-type, the second conductivity type is p-type, and if the first conductivity type is p-type, the second conductivity type is n-type. In each of the embodiments, a structure in which the first conductivity type is n-type and the second conductivity type is p-type is described as an example, but a structure in which the first conductivity type is p-type and the second conductivity type is n-type may be adopted. In the present application, the first conductivity type is described as the n-type, and thus the subscript 1 is attached for parameters relating to the first conductivity type, and the second conductivity type is described as the p-type, and thus the subscript 2 is attached for parameters relating to the second conductivity type. As described above, since these optical guide layers are usually undoped layers, "side" is added to distinguish which side of the active layer 7 the optical guide layers are on.

Although the main structure of the layers of the semiconductor laser device shown in FIG. 1 is the same as that shown in FIG. 8, as described below, the layer thicknesses and the refractive indices for the first conductivity type low refractive index layer 4 and the second conductivity type low refractive index layer 10, and the refractive indices for the first conductivity type cladding layer 3 and the second conductivity type cladding layer 11 are set so as to hold a condition $v_2 > v_1$, that is, $$v_2 = \frac{2\pi}{\lambda} \sqrt{n_{c2}^2 - n_2^2} \frac{d_2}{2} > v_1 = \frac{2\pi}{\lambda} \sqrt{n_{c1}^2 - n_1^2} \frac{d_1}{2} \qquad (4)$$

First, the number of modes in the y-direction is examined. The refractive indices of the first conductivity type side optical guide layer 56 and the active layer 7 are higher than those of the second conductivity type side optical guide layer 89, and the refractive index of each of the low refractive index layers is lower than the refractive index of the corresponding cladding layer in contact with. Accordingly, when the refractive indices of the first conductivity type side optical guide layer 56 and the active layer 7 are replaced by the refractive indices of the second conductivity type side optical guide layer 89 and the refractive index of each of the low refractive index layers is replaced by the refractive index of the corresponding cladding layer, v becomes smaller than that of the structure of the present application shown in FIG. 1. Therefore, if v of the structure with the replacement allows the first-order or higher-order mode, the structure of the present application shown in FIG. 1 also necessarily allows the first-order or higher-order mode. From FIG. 7 and Equation (2), v of the structure with the replacement is 2.39564, and it can be seen that the structure is such that the zero order mode (fundamental mode) and the first order mode are allowed.

More precisely, an average refractive index of the optical guide layers may be calculated in the following manner to obtain the number of allowed modes. Assuming that the refractive index and the layer thickness for the n-side first optical guide layer 6 are $n_{g11}$ and $d_{g11}$, the refractive index and the layer thickness for the n-side second optical guide layer 5 are $n_{g12}$ and $d_{g12}$, the refractive index and the layer thickness for the p-side first optical guide layer 8 are $n_{g21}$ and $d_{g21}$, and the refractive index and the layer thickness for the p-side second optical guide layer 9 are $n_{g22}$ and $d_{g22}$, the average refractive index $n_{gm}$ of the optical guide layers is expressed by Equation (5).

$$n_{gm} = \frac{n_{g11} \cdot d_{g11} + n_{g12} \cdot d_{g12} + n_{g21} \cdot d_{g21} + n_{g22} \cdot d_{g22}}{d_{g11} + d_{g12} + d_{g21} + d_{g22}} \quad (5)$$

By substituting $n_{gm}$ for $n_a$, the refractive index of the cladding layers for $n_b$, and $d_{g11}+d_{g12}+d_{g21}+d_{g22}$ for t in Equation (2), v is calculated to obtain the number of allowed modes. When the number of the guide layers is even larger, the number of allowed modes can be obtained in the same manner. Note that, although the active layer 7 is omitted because it is thin, it can be considered into the average refractive index in the same manner. In the y-direction, even when a higher order mode is allowed, an optical confinement rate of the fundamental (zero order) mode is the highest, that is, the gain of the fundamental (zero order) mode is the highest, so that the oscillation in the y-direction is generally in the fundamental (zero order) mode.

Next, the number of modes in the x-direction is examined. In the semiconductor laser device disclosed in the present application, the condition is such that the first-order or higher-order mode is allowed also in the x-direction. That is, when the effective refractive index of the region I which is the ridge region having a width W shown in FIG. 1 is $n_r$, and the effective refractive index for cladding regions II and IIa outside the ridge region is $n_b$, the condition is such that a relationship $$\frac{2\pi}{\lambda}\sqrt{n_r^2 - n_b^2}\frac{w}{2} > \frac{\pi}{2} \quad (6)$$

is satisfied. A structure satisfying this condition is sometimes called a broad area structure.

When the layer thickness $d_1$ of the first conductivity type low refractive index layer 4 is 200 nm, $v_1$ is 0.292273 at a wavelength of 975 nm. At this time, when the layer thickness $d_2$ of the second conductivity type low refractive index layer 10 is 140 nm, $v_2$ is 0.522208, and the condition $v_2>v_1$ holds. The effective refractive indices of the regions I, II and IIa are determined to be 3.41665, 3.41637, and 3.41637, respectively, and when the ridge width W satisfying the above Equation (6) is 100 µm, v is 14.09388. As a result, only nine modes from the zeroth order (fundamental mode) to the eighth order are allowed, and no modes higher than the ninth order are allowed.

As described above, when $d_2$ is 40 nm, which satisfies the condition $v_2<v_1$ disclosed in Patent Document 1, 20 modes are allowed as the mode in the x-direction, whereas when $d_2$ is 140 nm, which satisfies the condition $v_2>v_1$ disclosed in the present application, nine modes are allowed as the mode in the x-direction and thus the number of modes allowed in the x-direction can be reduced to half or less. That is, by setting the layer thicknesses of $d_2$ and $d_1$ so that the condition $v_2>v_1$ holds, the number of modes allowed in the x-direction is smaller and the divergence angle in the horizontal direction can be narrower than by setting the layer thicknesses of the respective layers so that the condition $v_2<v_1$ holds.

Note that, in Embodiment 1, the first conductivity type side optical guide layer 56 is made thicker than the second conductivity type side optical guide layer 89, and the position of the active layer is shifted from the center of the optical guide layers to the second conductivity type cladding layer side, as in the structure of Patent Document 1. With this structure, it is possible to reduce the light absorption by the carriers staying in the optical guide layers during operation and to increase the slope efficiency.

Embodiment 2

Figure 2:
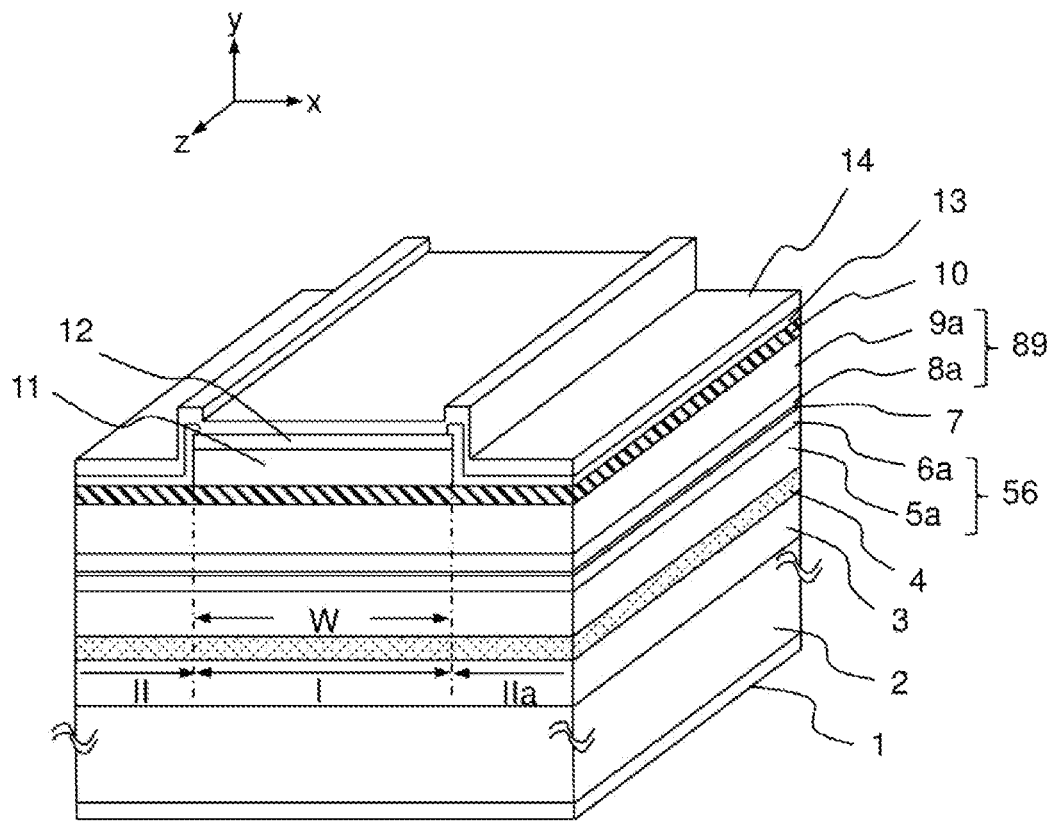
FIG. 2 is a schematic perspective view showing a laminated structure of a semiconductor laser device according to Embodiment 2.

FIG. 2 is a schematic perspective view showing a laminated structure of a semiconductor laser device according to Embodiment 2. Embodiment 2 is an embodiment in which a structure is symmetrical such that the active layer is disposed at the center of the optical guide layers. In FIG. 2, the first conductivity type side optical guide layer 56 is composed of an n-side AlGaAs second optical guide layer 5a having the Al composition ratio of 0.16 and a layer thickness of 700 nm and an n-side AlGaAs first optical guide layer 6a having the Al composition ratio of 0.14 and a layer thickness of 200 nm, and the second conductivity type side optical guide layer 89 is composed of a p-side AlGaAs first optical guide layer 8a having the Al composition ratio of 0.14 and a layer thickness of 200 nm and a p-side AlGaAs second optical guide layer 9a having the Al composition ratio of 0.16 and a layer thickness of 700 nm. The other layers are the same as in FIG. 1.

In the structure described above, when the layer thickness $d_1$ of the first conductivity type low refractive index layer 4 is 200 nm, $v_1$ is 0.292273, and when the layer thickness $d_2$ of the second conductivity type low refractive index layer 10 is 40 nm, $v_2$ is 0.149202, and the condition $v_2<v_1$, which is the condition disclosed in Patent Document 1, holds. The effective refractive indices of the regions I, II, and IIa at this time are determined to be 3.41873, 3.41810, and 3.41810, respectively, and when the ridge width W is 100 µm, v is 21.14672. As a result, 14 modes from the zeroth order (fundamental mode) to the thirteenth order are allowed.

On the other hand, in Embodiment 2, the parameters of each layer are set so that the condition $v_2>v_1$ can hold. As an example where the condition $v_2>v_1$ holds, the case where $d_2$ is 140 nm is examined. In the case where $d_2$ is 140 nm, then the condition $v_2>v_1$ holds because $v_2$ is 0.522208. The effective refractive indices of the regions I, II, and IIa are determined to be 3.41840, 3.41828, and 3.41828, respectively, and when the ridge width W is 100 µm, v is 9.229082. As a result, only six modes from the zeroth order (fundamental mode) to the fifth order are allowed. By setting $v_2>v_1$, it is possible to reduce the number of modes allowed in the horizontal direction as compared with the case where $v_2<v_1$, and to narrow the divergence angle in the horizontal direction.

Embodiment 3

Figure 3:
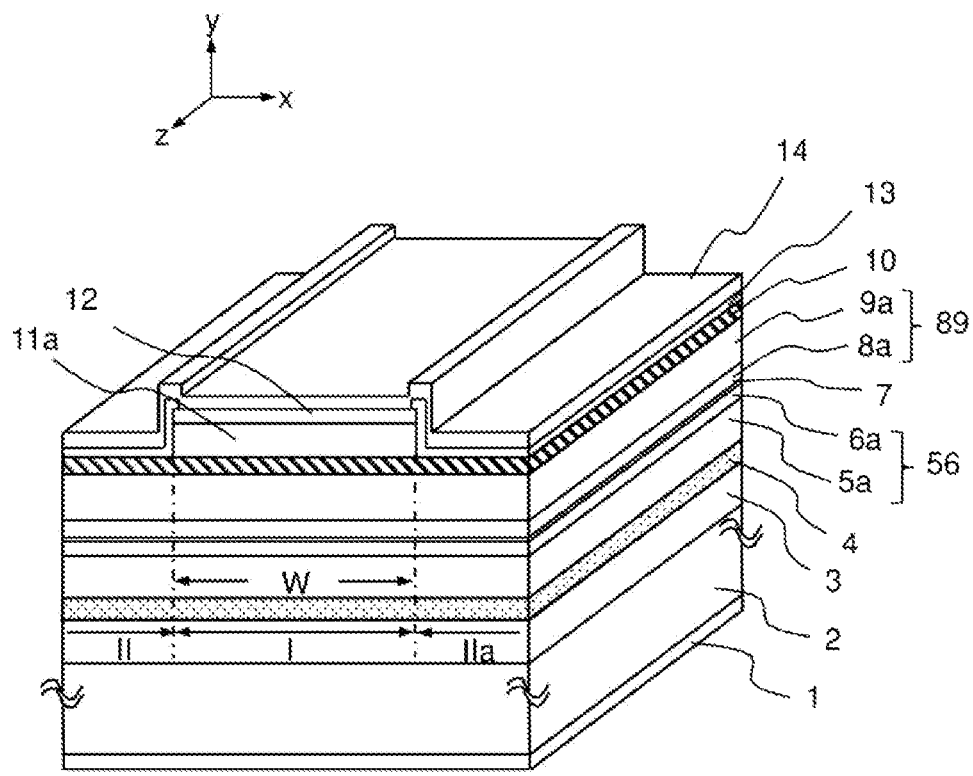
FIG. 3 is a schematic perspective view showing a laminated structure of a semiconductor laser device according to Embodiment 3.

FIG. 3 is a schematic perspective view showing a laminated structure of a semiconductor laser device according to Embodiment 3. Embodiment 3 is an embodiment in which a p-type AlGaAs cladding layer 11a having the Al composition ratio of 0.25 and a layer thickness of 1.5 μm is used as the p-type cladding layer 11 in FIG. 2 of Embodiment 2. With this structure, the refractive index $n_{c1}$ of the n-type cladding layer 3 (first conductivity type cladding layer) can be made higher than the refractive index $n_{c2}$ of the p-type cladding layer 11a (second conductivity type cladding layer). The other layers are the same as those in FIG. 2 of Embodiment 2. By adopting an asymmetric structure in which the refractive index $n_{c1}$ of the first conductivity type cladding layer 3 is made higher than the refractive index $n_{c2}$ of the second conductivity type cladding layer 11a, light absorption by the carriers in the second conductivity type cladding layer 11a can be reduced and the slope efficiency can be increased.

When the layer thickness $d_1$ of the first conductivity type low refractive index layer 4 is 200 nm, $v_1$ is 0.292273, and when the layer thickness $d_2$ of the second conductivity type low refractive index layer 10 is 40 nm, $v_2$ is 0.137275, and the condition $v_2<v_1$, which is the condition disclosed in Patent Document 1, holds. The effective refractive indices of the regions I, II, and IIa at this time are determined to be 3.41858, 3.41810, and 3.41810, respectively, and if the ridge width W is 100 μm, v is 18.45816. As a result, 12 modes from the zeroth order (fundamental mode) to the eleventh order are allowed.

On the other hand, in Embodiment 3, the parameters of each layer are set so that the condition $v_2>v_1$ can holds. As an example where the condition $v_2>v_1$ holds, the case where $d_2$ is 140 nm is examined. When $d_2$ is 140 nm, then $v_2$ is 0.480463, and the condition $v_2>v_1$ holds. The effective refractive indices of the regions I, II, and IIa at this time are determined to be 3.41837, 3.41828, and 3.41828, respectively, and when the ridge width W is 100 μm, v is 7.992602. As a result, only six modes from the zeroth order (fundamental mode) to the fifth order are allowed. By setting the condition $v_2>v_1$, it is possible to reduce the number of modes allowed in the horizontal direction as compared with the case where the condition $v_2<v_1$ holds and to narrow the divergence angle in the horizontal direction.

Embodiment 4

Figure 4:
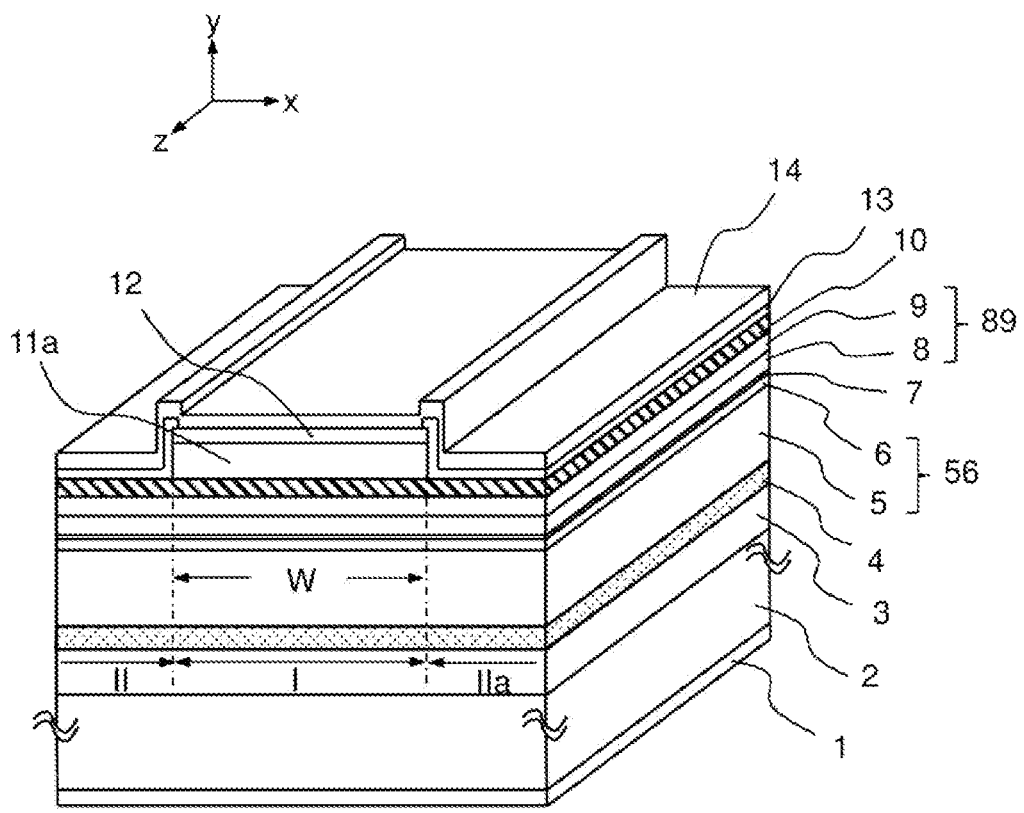
FIG. 4 is a schematic perspective view showing a laminated structure of a semiconductor laser device according to Embodiment 4.

FIG. 4 is a schematic perspective view showing a laminated structure of a semiconductor laser device according to Embodiment 4. In Embodiment 4, the p-type AlGaAs cladding layer 11a having the Al composition ratio of 0.25 and a layer thickness of 1.5 μm is used as the p-type cladding layer 11 in FIG. 1 of Embodiment 1. The other layers are the same as those in Embodiment 1. As in Embodiment 3, by adopting an asymmetric structure in which the refractive index $n_{c1}$ of the first conductivity type cladding layer 3 is higher than the refractive index $n_{c2}$ of the second conductivity type cladding layer 11a, light absorption by the carriers in the second conductivity type cladding layer 11a can be reduced. Further, by making the first conductivity type side optical guide layer 56 thicker than the second conductivity type side optical guide layer 89 and the active layer position is shifted from the center of the optical guide layers to the second conductivity type cladding layer side, it is possible to reduce light absorption by the carriers staying in the optical guide layers during operation and to increase the slope efficiency.

When the layer thickness $d_1$ of the first conductivity type low refractive index layer 4 is 200 nm, $v_1$ is 0.292273, and when the layer thickness $d_2$ of the second conductivity type low refractive index layer 10 is 40 nm, $v_2$ is 0.137275, and the condition $v_2<v_1$, which is the condition disclosed in Patent Document 1, holds. The effective refractive indices of the regions I, II, and IIa at this time are determined to be 3.41704, 3.41600, and 3.41600, respectively, and if the ridge width W is 100 μm, v is 27.16245. As a result, 18 modes from the zeroth order (fundamental mode) to the seventeenth order are allowed.

On the other hand, in Embodiment 4, the parameters of each layer are set so that the condition $v_2>v_1$ can hold. As an example where the condition $v_2>v_1$ holds, the case where $d_2$ is 140 nm is examined. When dais 140 nm, then $v_2$ is 0.480463, and the condition $v_2>v_1$ holds. The effective refractive indices of the regions I, II, and IIa at this time are determined to be 3.41659, 3.41637, and 3.41637, respectively, and when the ridge width W is 100 μm, v is 12.49284. As a result, only eight modes from zeroth order (fundamental mode) to seventh order are allowed. By setting the condition $v_2>v_1$, it is possible to reduce the number of modes allowed in the horizontal direction as compared with the case where the condition $v_2<v_1$ holds and to narrow the divergence angle in the horizontal direction.

Embodiment 5

Figure 5:
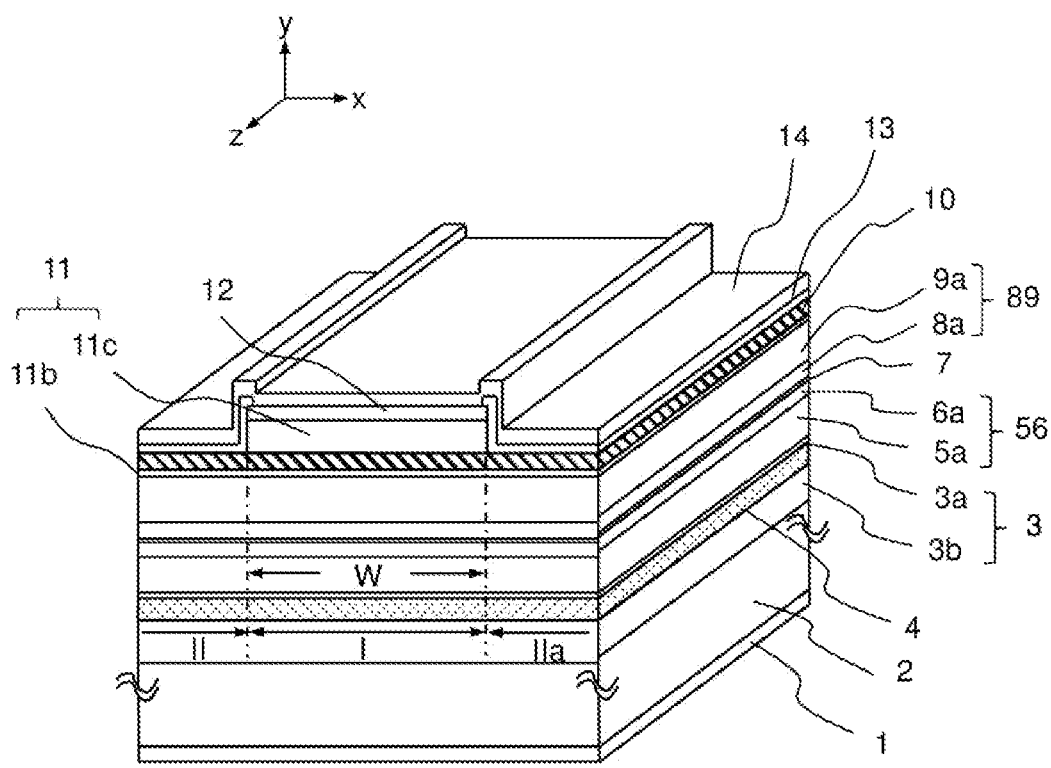
FIG. 5 is a schematic perspective view showing a laminated structure of a semiconductor laser device according to Embodiment 5.

FIG. 5 is a schematic perspective view showing a laminated structure of a semiconductor laser device according to Embodiment 5. Embodiment 5 is an example in which the second conductivity type low refractive index layer 10 and the first conductivity type low refractive index layer 4 are disposed inside the second conductivity type cladding layer 11 and the first conductivity type cladding layer 3, respectively. In the figure, the n-type AlGaAs cladding layer 3 having the Al composition ratio of 0.20 is composed of an n-type AlGaAs second cladding layer 3b having a layer thickness of 1.4 μm and an n-type AlGaAs first cladding layer 3a having a layer thickness of 0.1 μm, and the n-type low refractive index layer 4 is disposed between the n-type AlGaAs second cladding layer 3b and the n-type AlGaAs first cladding layer 3a. Further, the p-type AlGaAs cladding layer 11 having the Al composition ratio of 0.20 is composed of a p-type AlGaAs first cladding layer 11b having a layer thickness of 0.1 μm and a p-type AlGaAs second cladding layer 11c having a layer thickness of 1.4 μm, and the second conductivity type low refractive index layer 10 is disposed between the p-type AlGaAs first cladding layer 11b and the p-type AlGaAs second cladding layer 11c. The rest is the same as in Embodiment 2.

When the layer thickness $d_1$ of the first conductivity type low refractive index layer 4 is 200 nm, $v_1$ is 0.292273, and when the layer thickness $d_2$ of the second conductivity type low refractive index layer 10 is 40 nm, $v_2$ is 0.149202, and the condition $v_2<v_1$, which is the condition disclosed in Patent Document 1, holds. The effective refractive indices of the regions I, II, and IIa at this time are determined to be 3.41906, 3.41867, and 3.41867, respectively, and when the ridge width W is 100 µm, v is 16.63924. As a result, 11 modes from the zeroth order (fundamental mode) to the tenth order are allowed.

On the other hand, in Embodiment 5, the parameters of each layer are set so that $v_2 > v_1$ can holds. As an example where the condition $v_2 > v_1$ holds, the case where $d_2$ is 140 nm is examined. When dais 140 nm, then $v_2$ is 0.522208, and the condition $v_2 > v_1$ holds. The effective refractive indices of the regions I, II, and IIa at this time are determined to be 3.41886, 3.41878, and 3.41878, respectively, and when the ridge width W is 100 µm, v is 7.536043. As a result, only five modes from the zeroth order (fundamental mode) to the fourth order are allowed. By setting $v_2 > v_1$, it is possible to reduce the number of modes allowed in the horizontal direction as compared with the case where the condition $v_2 < v_1$ and to narrow the divergence angle in the horizontal direction.

Embodiment 6

Figure 6:
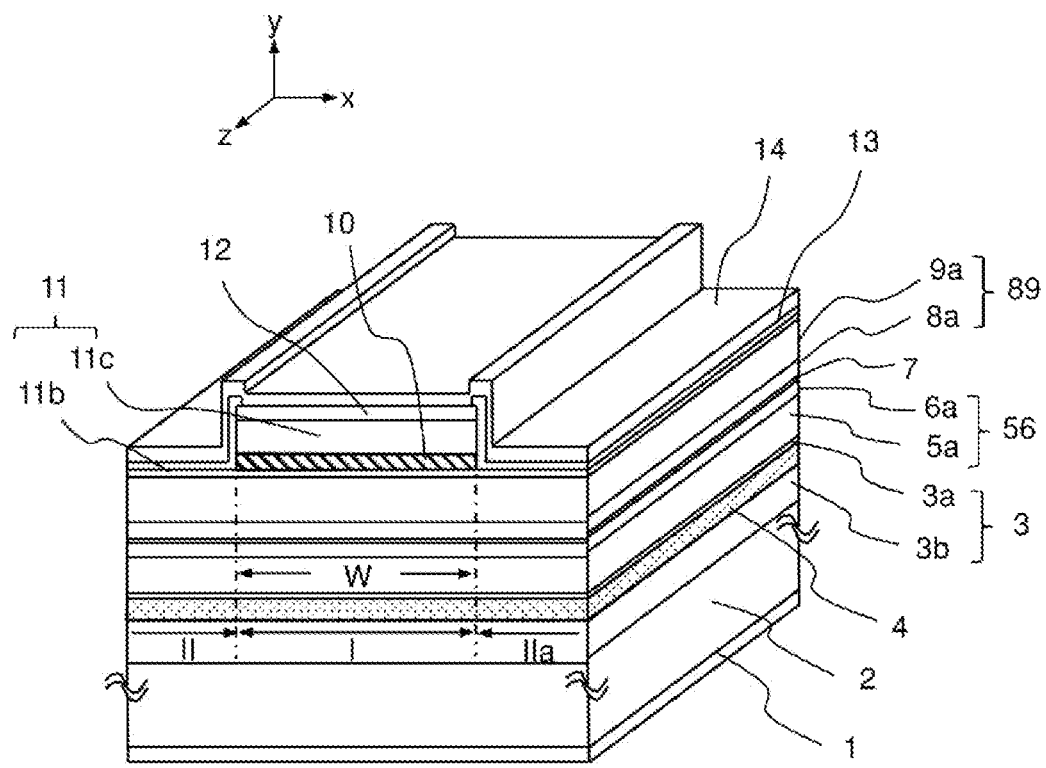
FIG. 6 is a schematic perspective view showing a laminated structure of a semiconductor laser device according to Embodiment 6.

FIG. 6 is a schematic perspective view showing a laminated structure of a semiconductor laser device according to Embodiment 6. Embodiment 6 is an embodiment in which, when forming the ridge, the p-type AlGaAs low refractive index layer 10 outside the ridge region I is removed, and etching is stopped in the p-type AlGaAs first cladding layer 11b. That is, the p-type low refractive index layer 10 (second conductivity type low refractive index layer) is formed only in the ridge region I. The rest is the same as in FIG. 5 of Embodiment 5.

When the layer thickness $d_1$ of the first conductivity type low refractive index layer 4 is 200 nm, $v_1$ is 0.292273, and when the layer thickness $d_2$ of the second conductivity type low refractive index layer 10 is 40 nm, $v_2$ is 0.149202, and the condition $v_2 < v_1$, which is the condition disclosed in Patent Document 1, holds. The effective refractive indices of the regions I, II, and IIa at this time are determined to be 3.41906, 3.41857, and 3.41857, respectively, and when the ridge width W is 100 µm, v is 18.65074. As a result, 12 modes from the zeroth order (fundamental mode) to the eleventh order are allowed.

On the other hand, in Embodiment 6, the parameters of each layer are set so that $v_2 > v_1$ can holds. As an example in which the condition $v_2 > v_1$ holds, the case where $d_2$ is 140 nm is examined. When $d_2$ is 140 nm, then $v_2$ is 0.522208, and the condition $v_2 > v_1$ holds. The effective refractive indices of the regions I, II, and IIa at this time are determined to be 3.41886, 3.41857, and 3.41857, respectively, and when the ridge width W is 100 µm, v is 14.34798. As a result, only 10 modes from the zeroth order (fundamental mode) to the ninth order are allowed. By setting $v_2 > v_1$, it is possible to reduce the number of modes allowed in the horizontal direction as compared with the case where the condition $v_2 < v_1$ holds and to narrow the divergence angle in the horizontal direction.

In each of the above-described embodiments, the case where the condition $v_2 > v_1$ is held by changing the layer thickness of the p-type low refractive index layer, that is, the second conductivity type low refractive index layer, has been described, but it is possible to holds the condition $v_2 > v_1$ by changing not only the layer thickness but also the refractive index or by changing both the layer thickness and the refractive index, and thus the effects described in each of the embodiments can be achieved. That is, the thickness and the refractive index for the n-type low refractive index layer and the p-type low refractive index layer, namely, the first conductivity type low refractive index layer and the second conductivity type low refractive index layer, and the refractive indices for the first conductivity type cladding layer and the second conductivity type cladding layer should be set so as to satisfy Equation (4).

In each of the above-described embodiments, the semiconductor laser having an oscillation wavelength of 975 nm has been described as an example, but it is needless to say that this wavelength is not a limitation. For example, in a GaN laser in the 400 nm band, a GaInP laser in the 600 nm band, and an InGaAsP laser in the 1550 nm band, similar effects can be obtained.

Note that, although various exemplary embodiments and examples are described in the present application, various features, aspects, and functions described in one or more embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF REFERENCE NUMERALS AND SIGNS

Claims

2 semiconductor substrate, 3 first conductivity type cladding layer, 4 first conductivity type low refractive index layer, 5 6 first conductivity type side optical guide layer, 7 active layer, 8 9 second conductivity type side optical guide layer, 10 second conductivity type low refractive index layer, 11 second conductivity type cladding layer, I ridge region, II, IIa cladding region

The invention claimed is:
1. A semiconductor laser device, comprising:
a first conductivity type cladding layer having a refractive index $n_{c1}$;
an undoped first conductivity type side optical guide layer;
an active layer;
an undoped second conductivity type side optical guide layer;
a second conductivity type cladding layer having a refractive index $n_{c2}$; and
a resonator in which laser light travels back and forth, the above layers being laminated in order on a semiconductor substrate of a first conductivity type, wherein
an oscillation wavelength is λ;
a structure of the device is such that a first-order or higher-order mode is allowed in a lamination direction in a cross section perpendicular to an optical axis direction of the resonator and is a broad area structure in which a first-order or higher-order mode is allowed in a direction perpendicular to the optical axis direction of the resonator and the lamination direction, the broad area structure being with a ridge shape having a ridge region and cladding regions on both sides of the ridge region; and
a first conductivity type low refractive index layer having a thickness of $d_1$ and a refractive index $n_1$ lower than $n_{c1}$ is provided between the first conductivity type side optical guide layer and the first conductivity type cladding layer or inside the first conductivity type cladding layer, a second conductivity type low refractive index layer having a thickness of $d_2$ and a refractive index $n_2$ lower than $n_{c2}$ is provided between the second conductivity type side optical guide layer and the second conductivity type cladding layer or inside the second conductivity type cladding layer, and a relationship $$\frac{2\pi}{\lambda}\sqrt{n_{c2}^2 - n_2^2}\frac{d_2}{2} > \frac{2\pi}{\lambda}\sqrt{n_{c1}^2 - n_1^2}\frac{d_1}{2}$$

is satisfied.

2. The semiconductor laser device according to claim 1, wherein a thickness of the first conductivity type side optical guide layer is larger than a thickness of the second conductivity type side optical guide layer.

3. The semiconductor laser device according to claim 2, wherein $n_{c1}$ is higher than $n_{c2}$.

4. The semiconductor laser device according to claim 3, wherein the second conductivity type low refractive index layer is formed only in the ridge region.

5. The semiconductor laser device according to claim 2, wherein the second conductivity type low refractive index layer is formed only in the ridge region.

6. The semiconductor laser device according to claim 1, wherein $n_{c1}$ is higher than $n_{c2}$.

7. The semiconductor laser device according to claim 6, wherein the second conductivity type low refractive index layer is formed only in the ridge region.

8. The semiconductor laser device according to claim 1, wherein the second conductivity type low refractive index layer is formed only in the ridge region.

9. The semiconductor laser device according to claim 1, wherein the semiconductor laser device is a GaAs device.

* * * * *